(12) United States Patent
Ando

(10) Patent No.: US 7,304,919 B2
(45) Date of Patent: Dec. 4, 2007

(54) OPTICAL INFORMATION REPRODUCING APPARATUS HAVING A SERVO CONTROL CIRCUIT

(75) Inventor: Hirotake Ando, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 412 days.

(21) Appl. No.: 10/608,108

(22) Filed: Jun. 30, 2003

(65) Prior Publication Data

US 2004/0013056 A1 Jan. 22, 2004

(30) Foreign Application Priority Data

Jul. 19, 2002 (JP) .............................. 2002-211261

(51) Int. Cl.
*G11B 7/00* (2006.01)

(52) U.S. Cl. .............................. 369/44.29; 369/44.35; 369/44.36

(58) Field of Classification Search ............ 369/44.29, 369/44.35, 44.36
See application file for complete search history.

(56) References Cited

U.S. PATENT DOCUMENTS

| | | | |
|---|---|---|---|
| 5,107,101 A | 4/1992 | Ando | 250/201.5 |
| 5,140,573 A | 8/1992 | Ando | 369/44.28 |
| 5,146,443 A * | 9/1992 | Iwase et al. | 369/44.29 |
| 5,251,194 A * | 10/1993 | Yoshimoto et al. | 369/44.26 |
| 5,347,503 A | 9/1994 | Koyama et al. | 369/44.32 |
| 5,404,346 A | 4/1995 | Koyama et al. | 369/44.32 |
| 5,699,330 A | 12/1997 | Ogino et al. | 369/32 |
| 5,751,674 A * | 5/1998 | Bradshaw et al. | 369/44.35 |
| 5,787,060 A | 7/1998 | Ando | 369/44.42 |
| 5,825,729 A | 10/1998 | Ogasawara et al. | 369/44.27 |
| 5,896,353 A * | 4/1999 | Naohara | 369/44.25 |
| 6,147,943 A | 11/2000 | Ogasawara et al. | 369/44.32 |
| 6,240,055 B1 * | 5/2001 | Takamine et al. | 369/44.29 |
| 6,606,284 B1 * | 8/2003 | Sakamoto et al. | 369/44.29 |
| 6,687,202 B1 | 2/2004 | Watanabe | 369/44.34 |
| 6,894,957 B1 * | 5/2005 | Shimada | 369/44.32 |

FOREIGN PATENT DOCUMENTS

| | | |
|---|---|---|
| JP | 08-030986 | 2/1996 |
| JP | 2000-207758 | 7/2000 |
| JP | 2000-311361 | 11/2000 |
| JP | 2001-344774 | 12/2001 |
| JP | 2002-117615 | 4/2002 |

* cited by examiner

*Primary Examiner*—Wayne Young
*Assistant Examiner*—VAn T. Pham
(74) *Attorney, Agent, or Firm*—Fitzpatrick, Cella Harper & Scinto

(57) ABSTRACT

In a CLV(constant linear velocity) or MCLV(substantially constant linear velocity)-type optical disk apparatus, instability of servo at inner and outer circumferences of an optical disk is prevented by adjusting a servo-loop gain of tracking servo control or focus servo control in accordance with the radial-direction position of an optical spot, i.e., in accordance with the rotation frequency of the optical disk.

4 Claims, 8 Drawing Sheets

OPTICAL INFORMATION REPRODUCING APPARATUS HAVING A SERVO CONTROL CIRCUIT

BACKGROUND OF THE INVENTION

1. Field of the Invention

The present invention relates to an optical information reproducing apparatus (optical disk apparatus), and more particularly, to an optical information reproducing apparatus for recording and reproducing optical information by performing control with a constant linear velocity or a substantially constant linear velocity by varying a rotation frequency of a disk in accordance with a radial-direction position.

2. Description of the Related Art

Conventional rotation control of an optical disk is performed by an optical disk apparatus for a CD (compact disc) or the like that performs rotation control with a constant linear velocity (CLV), or an optical disk apparatus in which the interior of a disk is divided into a plurality of zones and rotation control is performed so as to realize a substantially constant linear velocity (MCLV) between zones.

Recently, optical disk apparatuses have been developed in which a sample servo optical disk having clock marks or wobble marks, the number per track of which is constant, and which are pre-recorded radially from the center of the disk, is rotated using an MCLV process.

FIG. 6 is a block diagram illustrating a conventional optical disk apparatus.

As shown in FIG. 6, the optical disk apparatus includes an optical disk 1, a pickup 2 (having a laser source, a sensor, a focus actuator and a tracking actuator), a detection circuit 3, a focus-error generation circuit 4, a focus-phase compensation circuit 6, a focus-gain circuit 7, a focus-actuator driver 8, a tracking-error generation circuit 9, a tracking-phase compensation circuit 11, a tracking-gain circuit 12, a tracking-actuator driver 13, a spindle 15, a spindle control circuit 16, a spindle driver 17, and a controller 18.

A light beam emitted from the laser source of the pickup 2 is projected onto the optical disk 1. Light reflected from the optical disk 1 is sensed by the sensor of the pickup 2, and is converted into an electric signal by the detection circuit 3.

A focus-error signal is generated from an output from the detection circuit 3 by the focus-error generation circuit 4, and is supplied to the focus-actuator driver 8 via the focus-phase compensation circuit 6 and the focus-gain circuit 7, to control the focus actuator of the pickup 2, thus constituting a focus servo loop. Similarly, a tracking-error signal is generated from the output of the detection circuit 3 by the tracking-error generation circuit 9, and is supplied to the tracking-actuator driver 13 via the tracking-phase compensation circuit 11 and the tracking gain circuit 12, to control the tracking actuator of the pickup 2, thus constituting a tracking servo loop. The spindle driver 17 drives the spindle 15 so as to have a rotation frequency indicated by the controller 18, using the spindle control circuit 16 based on an FG (frequency generator) signal (not shown) or a synchronizing signal from the detection circuit 3, thus constituting a spindle control loop.

In a CLV method, a synchronizing signal from the disk is detected by the detector circuit 3, and rotation control is performed so as to maintain a constant linear velocity based on the synchronizing signal. In an MCLV method, a plurality of zones are provided in a radial direction, and the interior of each zone is controlled so as to have a constant rotation frequency using the spindle control circuit 16 based on the FG signal or the synchronizing signal from the detection circuit 3. In each of the above-described methods, the disk is controlled via CLV or MCLV process so that the rotation frequency is highest at the inner circumference in a radial direction and decreases toward the outer circumference.

In such optical disk apparatuses, a control band for tracking control, focus control and the like is designed so as to be able to perform control within a control error range desired for recording and reproducing operations in accordance with the amount of disturbance provided by disk standards, even if the maximum disturbance permitted by the disk standards is generated. That is, each of the focus-phase compensation circuit 6, the tracking-phase compensation circuit 11, the focus-gain circuit 7 and the tracking gain circuit 12 operates in a fixed control band designed irrespective of the rotation frequency.

FIG. 7 illustrates an example of tracking disturbance in a disk versus the rotation frequency of the disk when the center of the disk deviates from the center of rotation by 100 µm. For example, when the rotation frequency of the disk is 10 Hz, a disturbance of 100 µm is present at 10 Hz. As shown in FIG. 7, the frequency component of the disturbance decreases substantially in inverse proportion to the square of the frequency due to harmonic components or the like. The inclination of the disturbance represents eccentric acceleration of the disk. For example, at 10 Hz, the eccentric acceleration is 0.395 m/s², and at 20 Hz, the eccentric acceleration is 1.579 m/s². Accordingly, it can be understood that even if the eccentricity of the disk has a constant value of 100 µm, the frequency component of disturbance becomes larger (so as to move to the right in FIG. 7) a the rotational frequency of the disk becomes higher.

In actual disks, disturbance due to deviation of the center of the disk is the most significant (or the dominant) source of disturbance. The amount of disturbance including harmonic components hardly differs between the inner circumference and the outer circumference.

FIG. 8 illustrates an example of focusing disturbance in a disk.

FIG. 8 represents frequency characteristics of disturbance in a disk. It is assumed that the disk planer and rotates in an inclined state with respect to the plane of rotation, with an inclination of 100 µm at a radius of 50 mm, and the disk is rotated so as to maintain a constant linear velocity of 2.4 m/s at each radius (e.g., relative to a light spot of a recording/reproducing head). With respect to eccentricity, the frequency component of disturbance decreases substantially in inverse proportion to the square of the frequency due to harmonic components or the like. The inclination of the disturbance represents planer inclination acceleration of the disk. For example, the rotation frequency is 10 Hz at a radius of 38.2 mm, and the planer deviation acceleration at that time is 0.302 m/s². The rotation frequency is 20 Hz at a radius of 19.1 mm, and the planer deviation acceleration at that time is 0.603 m/s². Although the absolute value of the disturbance component of focus due to inclination with respect to the plane of rotation increases in proportion to the radius, the rotation frequency decreases in inverse proportion to the radius when the disk is rotated with a constant linear velocity. As a result, disturbance decreases as the radius increases (as the rotation frequency decreases).

In consideration of the above-described disturbance characteristics of the disk, in a disk apparatus which maintains a constant (or substantially constant) linear velocity, the standards of the disk must be provided so as not to exceed the standard of disturbance within the range of all rotation frequencies. As a result, the disturbance at the highest rotation frequency serving as the worst-case condition is provided as the standard, and a servo-loop gain is designed so as to suppress the disturbance so as to be maintained within a range of deviation desired for recording and reproducing operations.

However, if the servo loop gain is determined so as to adequately suppress the disturbance at the highest rotation frequency, although no problem arises at the highest rotation frequency, the servo-loop gain has a value more than sufficient at lower rotation frequencies, as can be understood from the above-described characteristics of disturbance of the disk.

If the servo-loop gain has a value that is greater than necessary, unnecessary noise also is amplified more than necessary, thereby causing current flow in the actuator and unnecessary power consumption. Unnecessary power consumption results in a temperature rise in the actuator and a temperature rise in the overall apparatus. Unnecessary power consumption also causes the actuator to generate noise.

In an MCLV method in which a sample servo optical disk having clock marks or wobble marks, the number per track of which is constant, and which are pre-recorded radially from the center of the disk, is rotated using an MCLV process, since the number of sampling points per track is maintained constant, the sampling frequency becomes lower as the rotation frequency becomes lower, and becomes higher as the rotation frequency becomes higher. Accordingly, if the servo-loop gain is determined so as to suppress disturbance at the highest rotation frequency (at the inner circumference), since the sampling frequency is smaller at an outer circumference having a lower rotation frequency, the servo system becomes unstable or incapable of maintaining control.

On the other hand, if the servo-loop gain is determined by adjusting the sampling frequency at the outer circumference, servo deviation cannot be suppressed so as to remain within an allowable range at the inner circumference.

For example, recent recording/reproducing systems that use a domain wall displacement detection (DWDD) method to achieve higher density recording on optical disks, require greatly reduced servo deviation characteristics. Also, recent trends to reduce the size of recording/reproducing systems require a corresponding reduction in power consumption. Accordingly, it is desirable to provide a servo control circuit having high accuracy (fidelity) and low power consumption.

SUMMARY OF THE INVENTION

The present invention has been made in consideration of the above-described drawbacks of conventional systems.

It is an object of the present invention to provide an optical information reproducing apparatus capable of suppressing servo deviation to a sufficiently small value with small power consumption by changing a servo control band and a filter coefficient in accordance with a rotation frequency.

In one aspect, the present invention relates to an optical information reproducing apparatus for recording or reproducing information by controlling rotation of an optical disk so as to provide a constant linear velocity by changing a rotation frequency in accordance with a radial-direction position of an optical spot, where the optical information reproducing apparatus includes a rotation control circuit that controls rotation of the optical disk, a focus servo control circuit and a tracking servo control circuit for the optical spot, and a tracking control circuit that adjusts a servo-loop gain for tracking servo control in accordance with the radial direction position of the optical spot.

In another aspect, the present invention relates to an optical information reproducing apparatus for recording or reproducing information using an optical spot by controlling rotation of an optical disk so as to provide a linear velocity by changing a rotation frequency in accordance with a radial-direction position of the optical spot, where the optical information reproducing apparatus includes a rotation control circuit that controls rotation of the optical disk, a focus servo control circuit and a tracking servo control circuit for the optical spot, and a focus control circuit that adjusts a servo-loop gain for focus servo control in accordance with the radial-direction position of the optical spot.

The foregoing and other objects, advantages and features of the present invention will become more apparent from the following description of the preferred embodiments taken in conjunction with the accompanying drawings.

DESCRIPTION OF THE PREFERRED EMBODIMENTS (First Embodiment)

Figure 1:
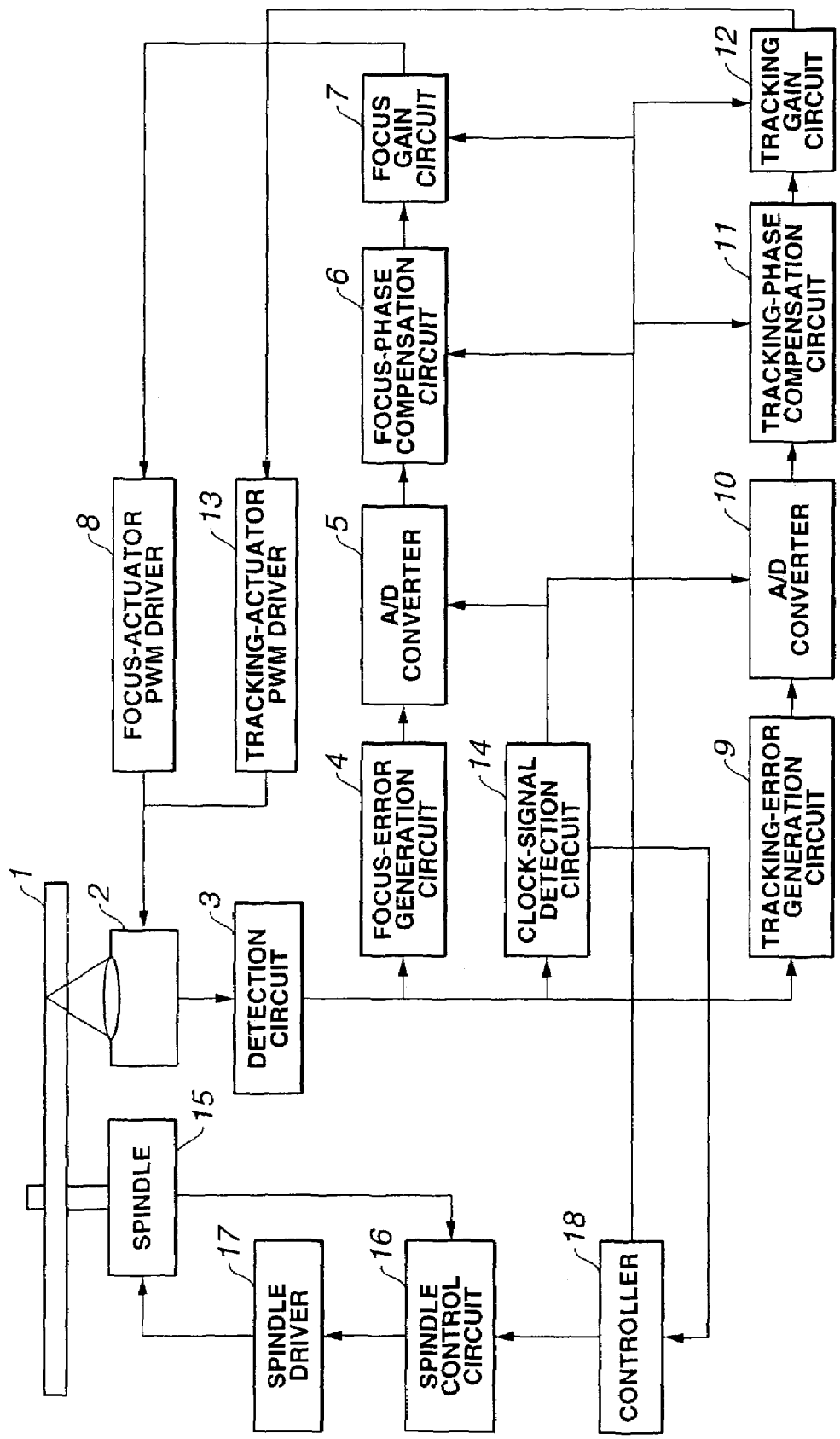
FIG. 1 is a block diagram illustrating an optical disk apparatus according to a first embodiment of the present invention.

FIG. 1 is a block diagram illustrating an optical disk apparatus according to a first embodiment of the present invention.

As shown in FIG. 1, the optical apparatus includes an optical disk 1, a pickup 2 (having a laser source, a sensor, a focus actuator and a tracking actuator), a detection circuit 3, a focus-error generation circuit 4, an A/D (analog-to-digital) converter 5, a focus-phase compensation circuit 6, a focus gain circuit 7, a focus-actuator PWM (pulse-width modulation) driver 8, a tracking-error generation circuit 9, an A/D converter 10, a tracking-phase compensation circuit 11, a tracking-gain circuit 12, a tracking-actuator PWM driver 13, a clock-signal detection circuit 14, a spindle 15, a spindle control circuit 16, a spindle driver 17, and a controller 18.

The optical disk 1 is a sample servo optical disk in which clock marks or wobble marks are recorded radially from the center of the disk.

The clock marks or the wobble marks are pre-recorded in 1,280 sample servo regions per track.

A light beam emitted from the laser source of the pickup 2 is projected onto the optical disk 1. Light reflected from the optical disk 1 is sensed by the sensor of the pickup 2, and is converted into an electric signal by the detection circuit 3.

A focus-error signal is generated from an output from the detection circuit 3 by the focus-error generation circuit 4, and is supplied to the focus-actuator PWM driver 8 after being converted to a digital signal by the A/D converter 5, and then with a clock period output from the clock-signal detection circuit 14 by the focus-phase compensation circuit 6 and the focus gain circuit 7, to control the focus actuator of the pickup 2, thereby constituting a focus servo loop.

Similarly, a tracking-error signal is generated from the output from the detection circuit 3 using wobble marks on the optical disk 1 by the tracking-error generation circuit 9, and is supplied to the tracking-actuator PWM driver 13 after being converted to a digital signal by the A/D converter 10, and then with the clock period output from the clock-signal detection circuit 14 by the tracking-phase compensation circuit 11 and the tracking gain circuit 12, to control the tracking actuator of the pickup 2, thereby constituting a track servo loop.

The spindle driver 17 drives the spindle 15 so as to have a desired rotation frequency indicated using the controller 18, by the spindle control circuit 16 based on an FG signal (not shown) or a synchronizing signal from the clock-signal detection circuit 14, thereby constituting a spindle control loop.

In the first embodiment, each of focus control and tracking control is performed discretely by sampling with a clock-mark period output from the clock-signal detection circuit 14. That is, a sample period is obtained by multiplying the rotation frequency by the number of clock pulses per track. For example, if the spindle 15 rotates with a frequency of 30 Hz, sampling frequency is 38.4 kHz, obtained by multiplying the frequency (30 Hz) by 1,280, the number of clock pulses per track. In this regard, since clock marks cannot be detected until focus control is stabilized, the phase of the sampling period may deviate from the phase of the clock marks. After detecting a clock mark, sampling synchronized with clock marks is performed, e.g., using a PLL (phase-locked loop) circuit (not shown) or the like. Outputs from the focus-error generation circuit 4 and the tracking-error generation circuit 9 are sampled by the A/D converters 5 and 10 with the sampling period and input to the focus-phase compensation circuit 6 and the tracking-phase compensation circuit 11, respectively. Each of the focus-phase compensation circuit 6 and the tracking-phase compensation circuit 11 is configured with a digital filter, and is subjected to filter calculation with a filter coefficient set by the controller 18. Each of the focus-gain circuit 7 and the tracking gain circuit 12 is a digital multiplier, and its gain is set by the controller 18. Outputs from the focus gain circuit 7 and the track gain circuit 12 are output as PWM signals to the focus-actuator PWM driver 8 and the tracking-actuator PWM driver 13, respectively.

In the first embodiment, rotation control of the disk is performed according to an MCLV method, and a zone is provided for each predetermined number of tracks in a radial direction. Control is performed with a constant rotation frequency within each zone, and with a substantially constant linear velocity between zones. When a zone changes as a result of seeking or the like, control is performed such that a predetermined rotation frequency is obtained so as to provide a constant linear velocity for each zone, and a stationary rotation state is provided with a predetermined rotation frequency after passing through a transient state. When a target linear velocity is represented by Vt (m/s), a radius at start is represented by Rn (m), and a rotation frequency is determined so that the target linear velocity is a linear velocity at the position of start of each zone, a rotation frequency Wn (Hz) of zone N is expressed by:

$$Wn = Vt/(2 \times \pi \times Rn).$$

This rotation frequency is a stationary rotation frequency at each zone.

Next, a description will be provided of a method for setting values for the focus-phase compensation circuit 6, the tracking-phase compensation circuit 11, the focus-gain circuit 7 and the tracking-gain circuit 12.

First, a tracking control system will be described. When a tracking eccentric component is represented by S (μm), eccentric acceleration A (m/s²) of disturbance when the disk is rotated at the rotation frequency Wn (Hz) is expressed by:

$$A = S \times (2 \times \pi \times Wn)^2.$$

When a target control deviation is represented by ε(μm), and a frequency where disturbance equals the target control deviation is represented by $f_0$, $$f_0 = 1/(2\times\pi)\sqrt{A/\epsilon} = Wn \times \sqrt{S/\epsilon}.$$

The tracking control band must be at least $f_0$. When a necessary control band is represented by F, $$F = \beta \times f_0 = \beta \times Wn \times \sqrt{S/\epsilon}.$$

It can be understood that F is proportional to Wn (β represents a margin).

For example, when a zone having the highest rotation frequency is represented by zone 0, and the band and the rotation frequency at that time are represented by $F_{z0}$ and $W_0$, respectively, a band $F_{zn}$ at zone N is expressed by:

$$F_{zn} = F_{z0} \times (Wn/W_0).$$

The controller 18 has a gain table of the tracking gain circuit 12 corresponding to a necessary band at each zone obtained from the above-described equation, and sets a constant to the tracking gain circuit 12 in accordance with a zone (rotation frequency).

Figure 3:
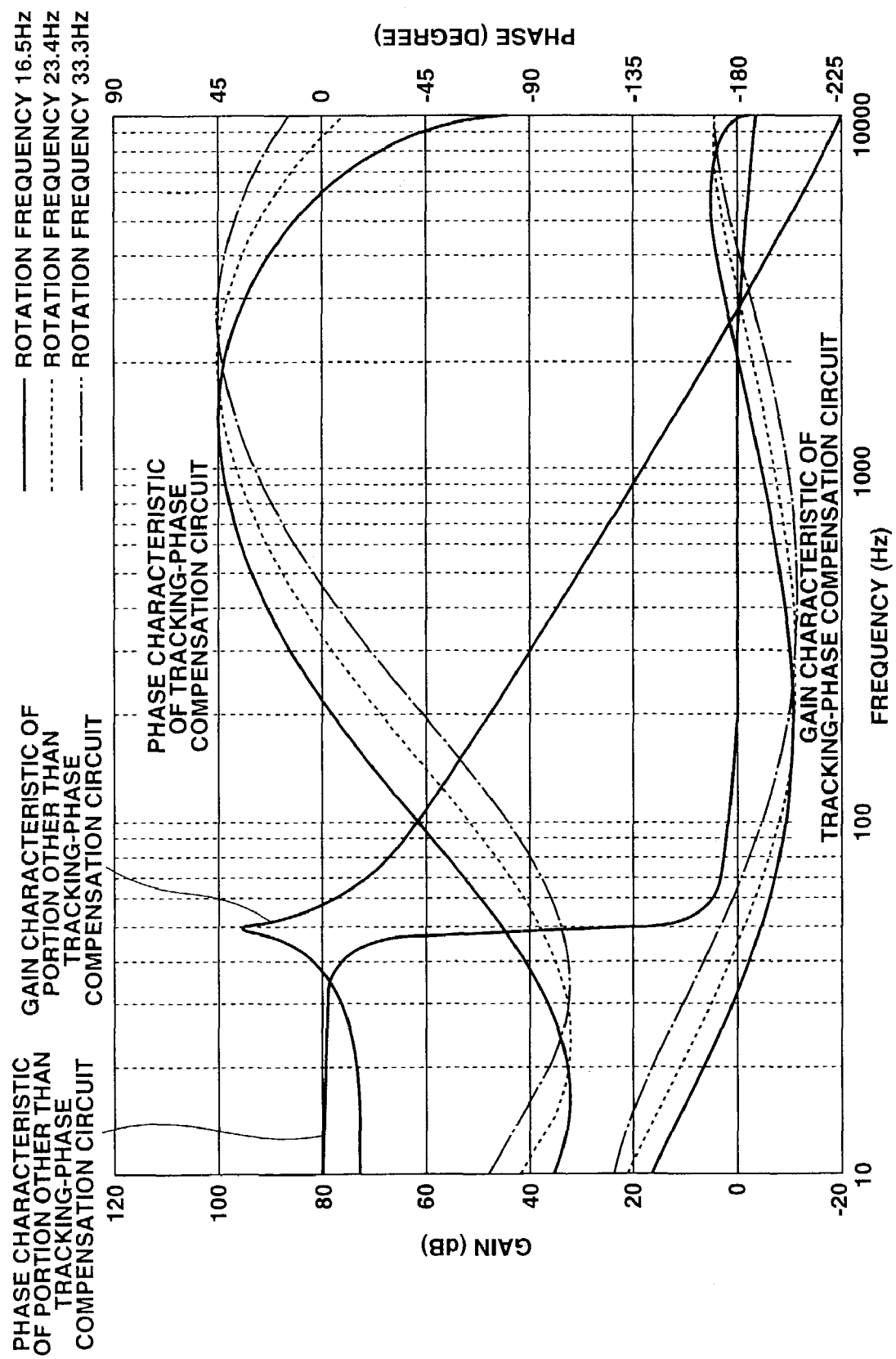
FIG. 3 is a graph illustrating frequency characteristics of each component when changing a rotation frequency while fixing a filter coefficient.

The fact that a band changes only by changing the constant of the tracking gain circuit 12 will now be described. FIG. 3 illustrates phase characteristics and gain characteristics of the tracking-phase compensation circuit 11 and other portions when the rotation frequency is changed among the values 33.3 Hz (zone 0), 23.4 Hz and 16.5 Hz, in a state in which the coefficient of a phase compensation filter covers the necessary band at the rotation frequency at inner circumference zone 0. Measurements were performed in a state in which the gain of the tracking gain circuit 12 is fixed. As can be understood from FIG. 3, by changing the rotation frequency, the frequency characteristic of the tracking-phase compensation circuit 11 moves toward lower frequencies. Since the gain is fixed, the frequency characteristics of portions other than the tracking-phase compensation circuit 11 do not change even if the rotation frequency changes.

Figure 4:
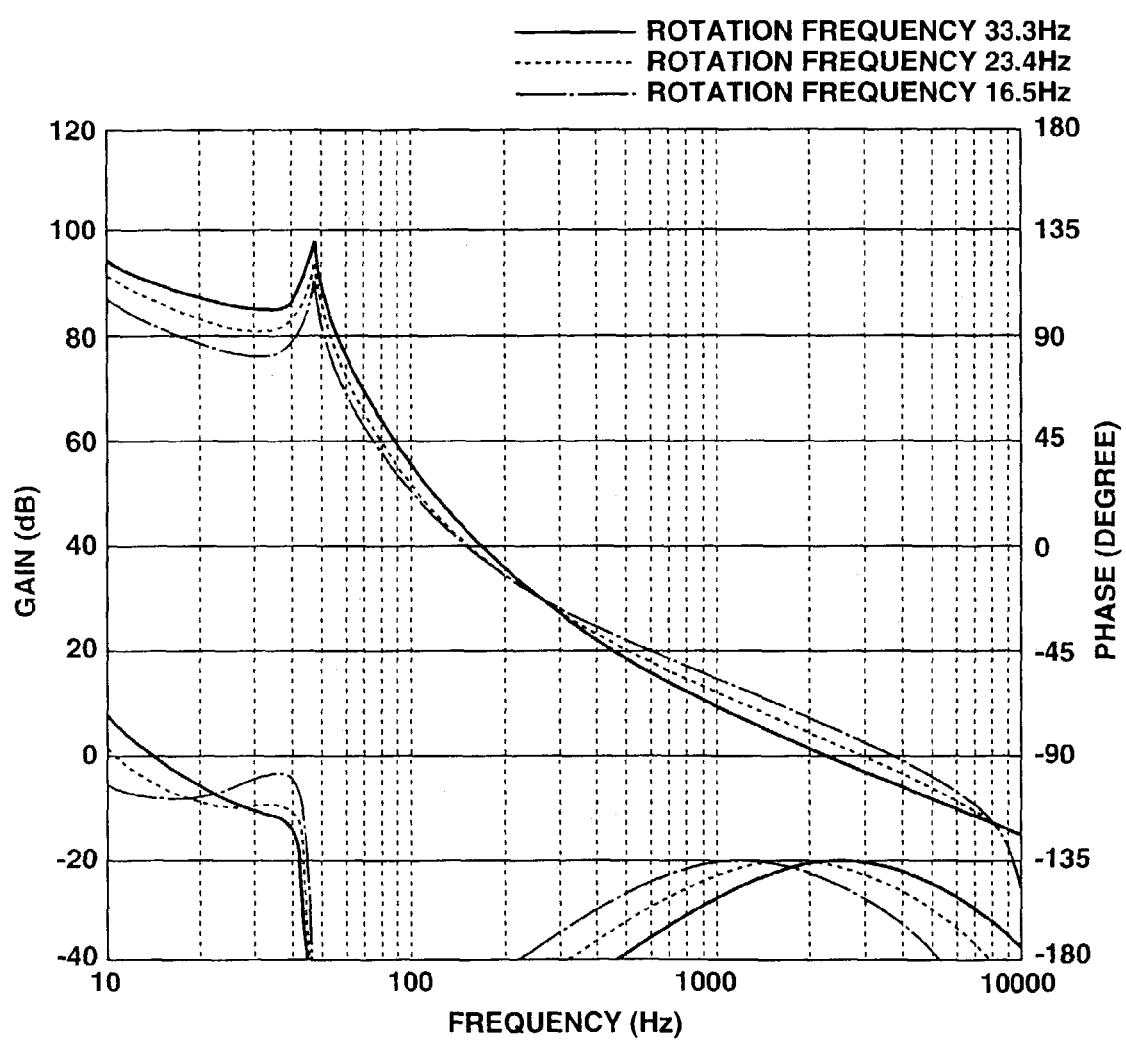
FIGS. 4 and 5 are graphs, each illustrating open-loop frequency characteristics when changing a rotation frequency while fixing a filter coefficient.

When the rotation frequency is changed, the output of the clock-signal detection circuit 14 detecting 1,280 clock marks per rotation changes, resulting in a change in the sampling frequency for tracking servo control. If the filter coefficient of the tracking-phase compensation circuit 11 is fixed, the frequency characteristic of the tracking-phase compensation circuit 11 changes in accordance with the sampling frequency. Since the gain is fixed, the servo band shifts to the higher frequency side, and a phase margin (indicating a margin until the phase becomes −180° at a gain crossover frequency) decreases. FIG. 4 illustrates open-loop characteristics indicating how the phase margin decreases.

Figure 5:
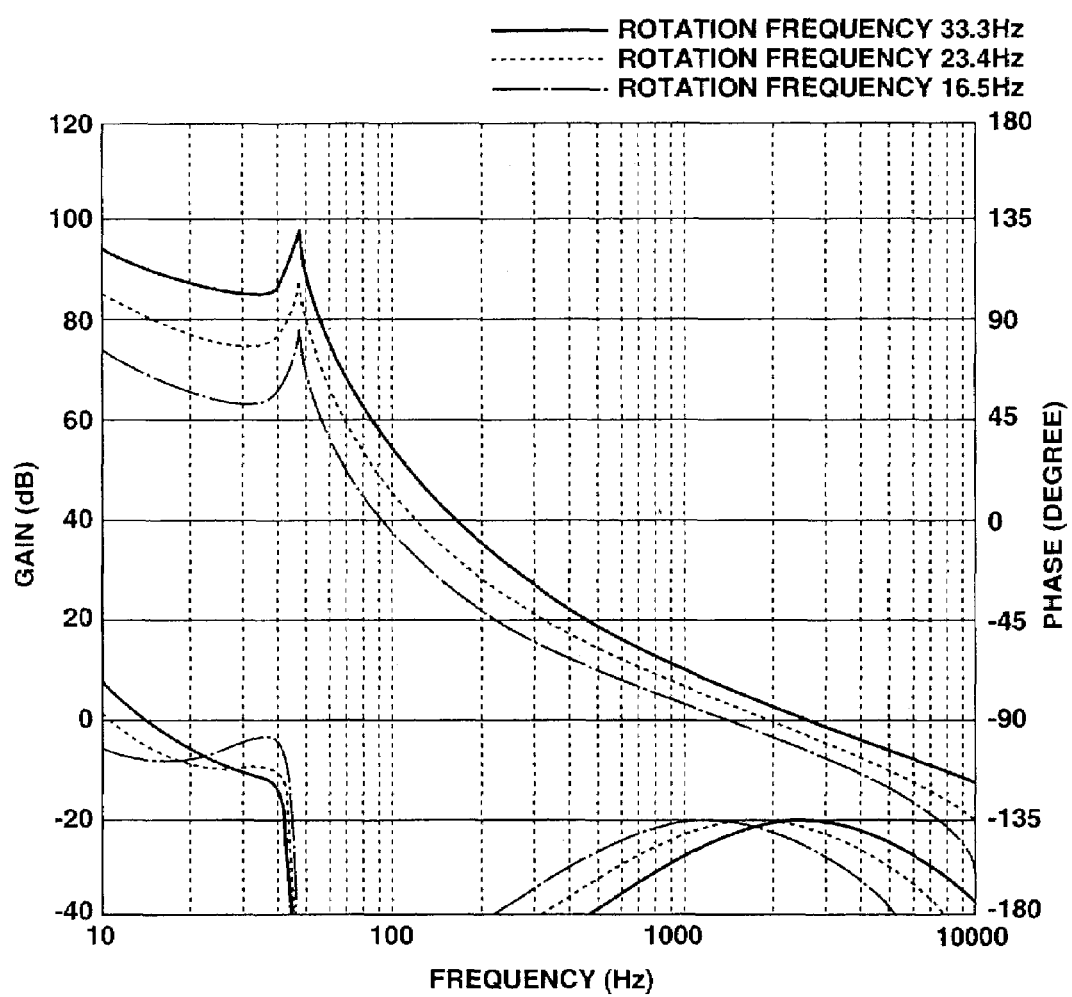
Figure 6:
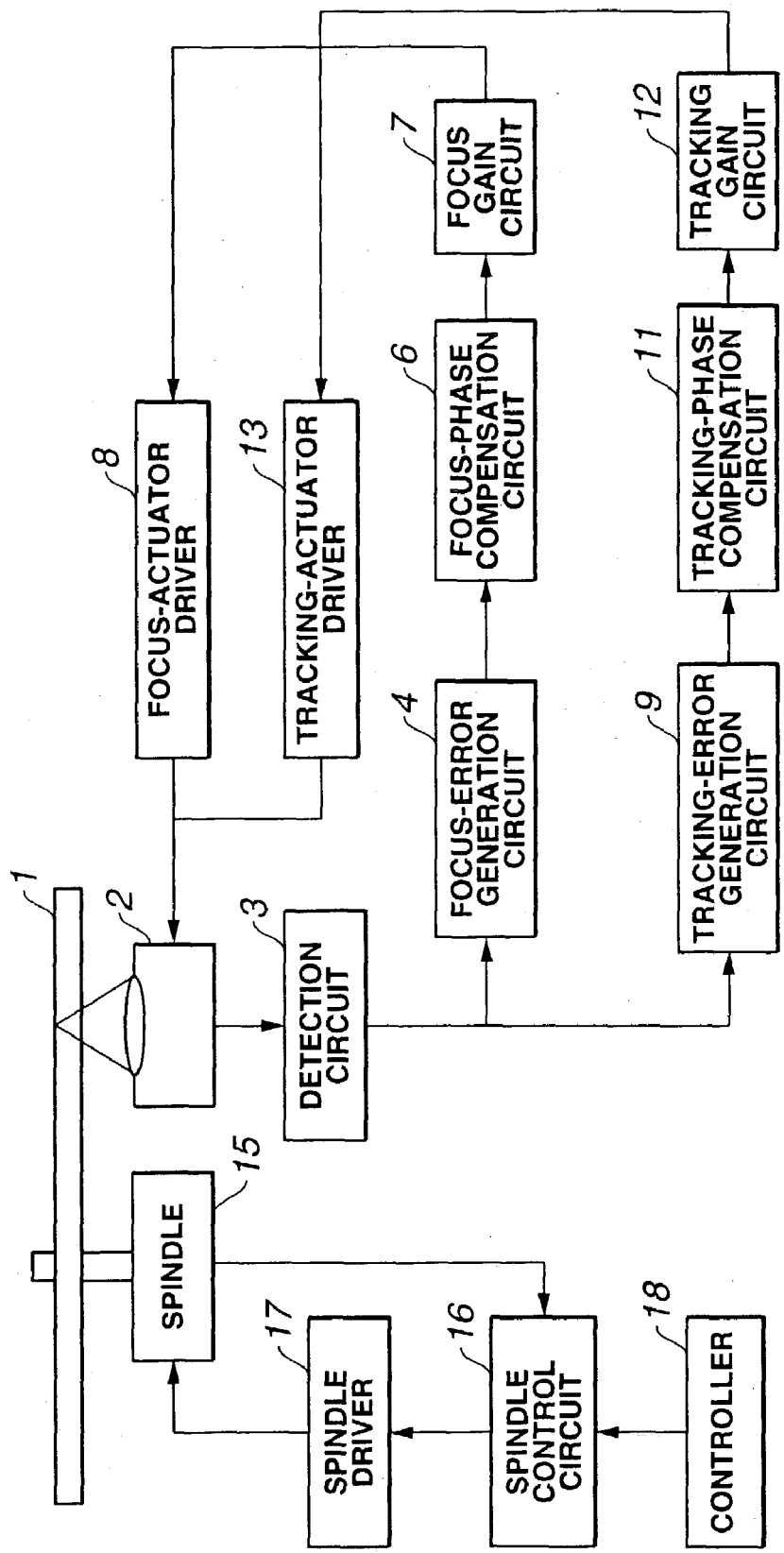
FIG. 6 is a block diagram illustrating a conventional optical disk apparatus.
Figure 7:
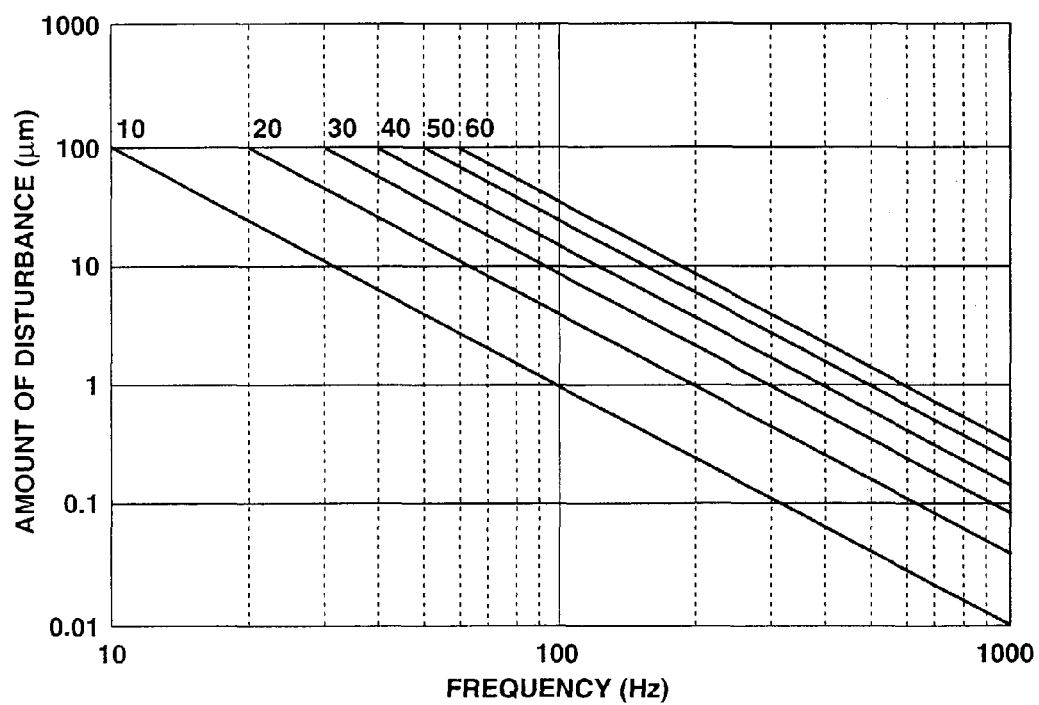
FIG. 7 is a graph illustrating frequency characteristics of tracking disturbance.
Figure 8:
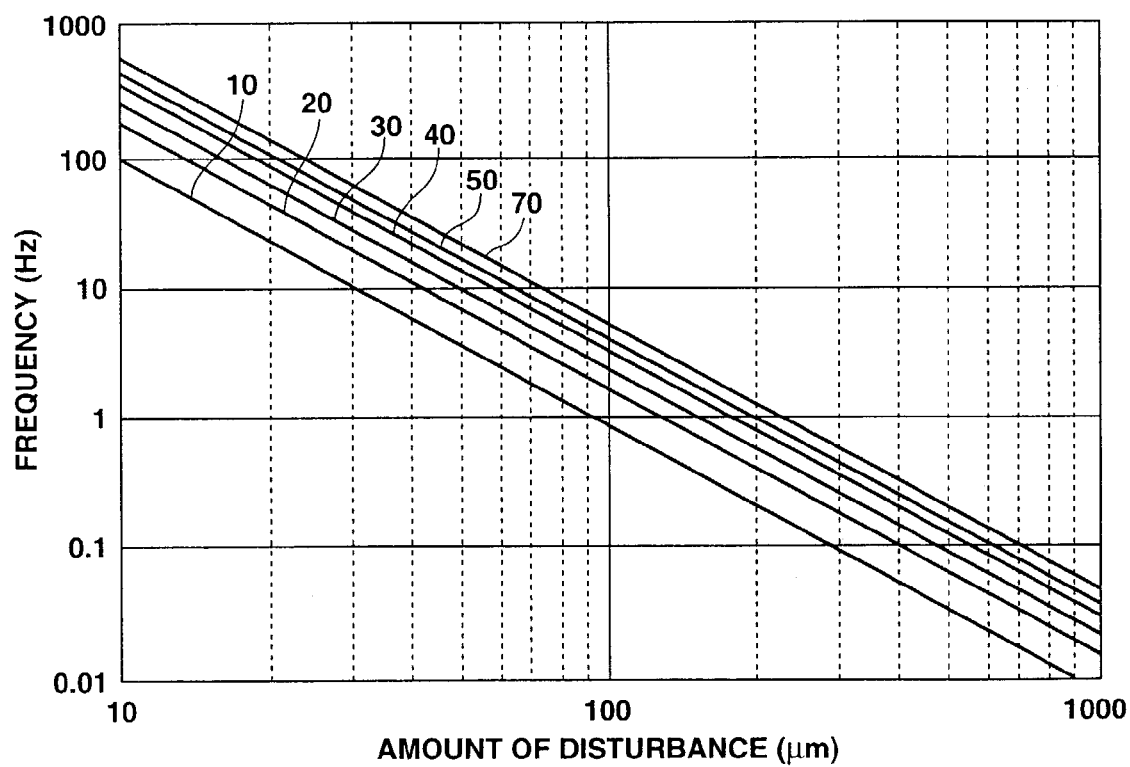
FIG. 8 is a graph illustrating frequency characteristics of focusing disturbance.

FIG. 5 illustrates changes in open-loop characteristics when the coefficient of the phase compensation filter covering the necessary band at the highest rotation frequency (inner circumference zone 0) is fixed, the rotation frequency is changed in the same manner as shown in FIG. 3, and the gain is changed in accordance with the rotation frequency. As can be understood from FIG. 5, the servo band decreases as the rotation frequency is reduced, and the phase margin is sufficient. At the same time, these servo characteristics satisfy the above-described equation relating to the necessary band. That is, when the rotation frequency (33.3 Hz) of zone 0 is made 1, he ratios of respective rotational frequencies are 0.7 and 0.5 at 23.4 Hz and 16.5 Hz, respectively, and corresponding servo bands proportional to the rotation-frequency ratio are 2.64 kHz, 1.85 kHz and 1.30 kHz. At that time, the gain may be set by multiplying the square of the rotation-frequency ratio with respect to zone 0 by the gain value for zone 0. For example, suppose that the rotation frequency of zone 0 is 33.3 Hz, and the rotation frequency of a certain zone is 16.5 Hz. Since the ratio is about 0.5, the gain of that zone is obtained by multiplying the gain at zone 0 by 0.25, i.e., the square of 0.5.

When the gain and the rotation frequency at zone 0 are represented by $G_{z0}$ and $W_0$, respectively, the gain $G_{zn}$ of zone N rotating at a rotation frequency of $W_n$ is expressed by:

$$G_{zn}=G_{z0}\times(Wn/W_0)^2.$$

That is, the gain table may have the value of the square of the rotation-frequency ratio with respect to zone 0 corresponding to each zone, and the gain to be set can be determined by multiplying the gain at zone 0 by the value of the gain table at each zone.

In the first embodiment, since it is unnecessary to change the coefficient of the phase compensation filter, it is unnecessary to have a table for the coefficient of the phase compensation filter, and therefore the capacity of a ROM (read-only memory) and a RAM (random access memory) of the controller can be reduced.

Although in the first embodiment, a sampling servo operation has been described, the same effects can also be obtained by appropriately changing the sampling frequency in accordance with the radial-direction position, as in the case of sampling servo operation, and using a phase compensation circuit that uses a digital filter operating at that frequency.

The equation for calculating the band may be within a range where a necessary control error is secured (depending on the value of α), such as:

$$F_{zn}=\alpha\times F_{z0}\times(Wn/W_0).$$

For example, the value of α may be changed stepwise in accordance with the rotational frequency (zone) toward lower rotation frequencies than at zone 0, such as 0.95 (or 1.05) for zone 1, and 0.9 (or 1.1) for zone 2.

Furthermore, by changing the filter coefficient of the tracking-phase compensation circuit 11, as well as the constant of the tracking gain circuit 12, finer band control can be performed.

In this case, also, the overall servo characteristics are not controlled by a wasteful servo-loop gain, which is greater than necessary, by changing the overall servo characteristics in the same manner as when changing only the gain (see FIG. 5).

Next, a focus control system will be described.

In contrast to the eccentric component, the amount of the focus plane deviation component differs depending on the radial direction. For example, when it is assumed that the disk is planer and rotates in an inclined state with respect to the plane of rotation, at an angle of inclination of θ (degrees), the amount of plane deviation S (μm) at a radius Rn is expressed by:

$$S=Rn\times sin\ \theta.$$

The plane deviation acceleration A (m/s²) of disturbance when the disk rotates with a rotation frequency of Wn (Hz) is expressed by:

$$A=S\times(2\times\pi\times Wn)^2.$$

When the target control deviation is represented by ε(μm), the frequency $f_0$ where disturbance equals the target deviation is expressed by:

$$f_0 = 1/(2\times\pi)\sqrt{A/\varepsilon} = Wn\times\sqrt{S/\varepsilon} = Wn\times\sqrt{(Rn\times sin\theta)/\varepsilon}$$
$$= \sqrt{(sin\theta\times Vt\times Wn)/(2\times\pi\times\varepsilon)}.$$

The focus control band must be at least $f_0$. When a necessary control band is represented by F, $$F=\beta\times f_0=\beta\times\sqrt{(sin\theta Vt Wn)/(2\pi\varepsilon)}.$$

It can be understood that F is proportional to $\sqrt{Wn}$ (β represents the amount of a margin). For example, when a zone having the highest rotation frequency is represented by zone 0, and the band and the rotation frequency at that time are represented by $F_{z0}$ and $W_0$, respectively, the band $F_{zn}$ at zone N is expressed by:

$$F_{zn}=F_{z0}\times\sqrt{Wn/W_0}.$$

The controller 18 has a table of constants for phase compensation and a gain table of the focus-gain circuit 7 corresponding to a necessary band at each zone, and sets respective constants to the focus-phase compensation circuit 6 and the focus gain circuit 7 in accordance with a zone (rotational frequency).

If the filter coefficient is set so that the gain of the focus-phase compensation circuit 6 at the necessary band frequency at each zone has a constant value, the gain to be set to the focus gain circuit 7 for providing the necessary band is the square of the necessary band ratio. Since the necessary band is the root of the rotation-frequency ratio, it is only necessary to multiply the gain at zone 0 by the rotational-frequency ratio. When the gain and the rotation frequency at zone 0 are represented by $G_{z0}$ and $W_0$, respectively, the gain $G_{zn}$ at zone N rotating at a rotation frequency of $W_n$ is expressed by:

$$G_{zn}=G_{z0}\times(Wn/W_0).$$

That is, the gain table may have the value of the rotation-frequency ratio with respect to zone 0 corresponding to each zone, and the gain to be set can be determined by multiplying the gain at zone 0 by the value of the gain table at each zone.

The gain table for tracking control has the value of the square of the rotation-frequency ratio. Accordingly, for example, by making the root of the gain table for tracking control the gain table of focus control, or, in the alternative, by obtaining the square of the gain table for focus control, a common gain table can be used both for focus control and tracking control, and therefore the capacity of the ROM and the RAM of the controller 18 can be reduced.

A weight a similar to the case of tracking control may be provided in the equation for calculating the band within a range to secure a necessary control error as:

$$F_{zn} = \alpha \times F_{z0} \times \sqrt{Wn/W_0}.$$

Although in the focus control operation of the first embodiment the servo sampling has been described, the same effects as in the case of tracking control, in which the filter coefficient is fixed and only the gain is changed, can also be obtained by appropriately changing the sampling frequency so as to perform sampling proportional to the root of the rotation-frequency ratio in accordance with the radial-direction position, and using a phase compensation circuit that uses a digital filter operating at that frequency.

As described above, in the sample servo operation, the sampling period changes in accordance with the rotation frequency and the servo band is narrowed by reducing the servo-loop gain in accordance with a decrease in the sampling frequency at the outer circumference side where the rotation frequency is low. Since disturbance of the disk is small, deviation can be suppressed within an allowable range of servo. Furthermore, since the servo band is widened by increasing the servo-loop gain at the inner circumference side compared with the sampling frequency at the outer circumference side, servo deviation can be suppressed within an allowable range at higher rotation at the inner circumference side. By determining the servo-loop gain in accordance with a predetermined stationary rotation frequency, control can be performed with sufficient accuracy without performing control with a wasteful servo-loop gain, which is greater than necessary, and setting a servo-loop gain that becomes unstable at the sampling frequency in any rotation frequency.

Furthermore, it is possible to prevent temperature rise of the apparatus with small power consumption, and to reduce noise generated by the actuator.

By changing the sampling frequency in accordance with a radial-direction position (zone), only the gain is changed while fixing the coefficient of the phase compensation filter at each zone. By commonly using a gain table both for tracking control and focus control, it is possible to reduce the capacity of the ROM and the RAM of the controller.

(Second Embodiment)

Figure 2:
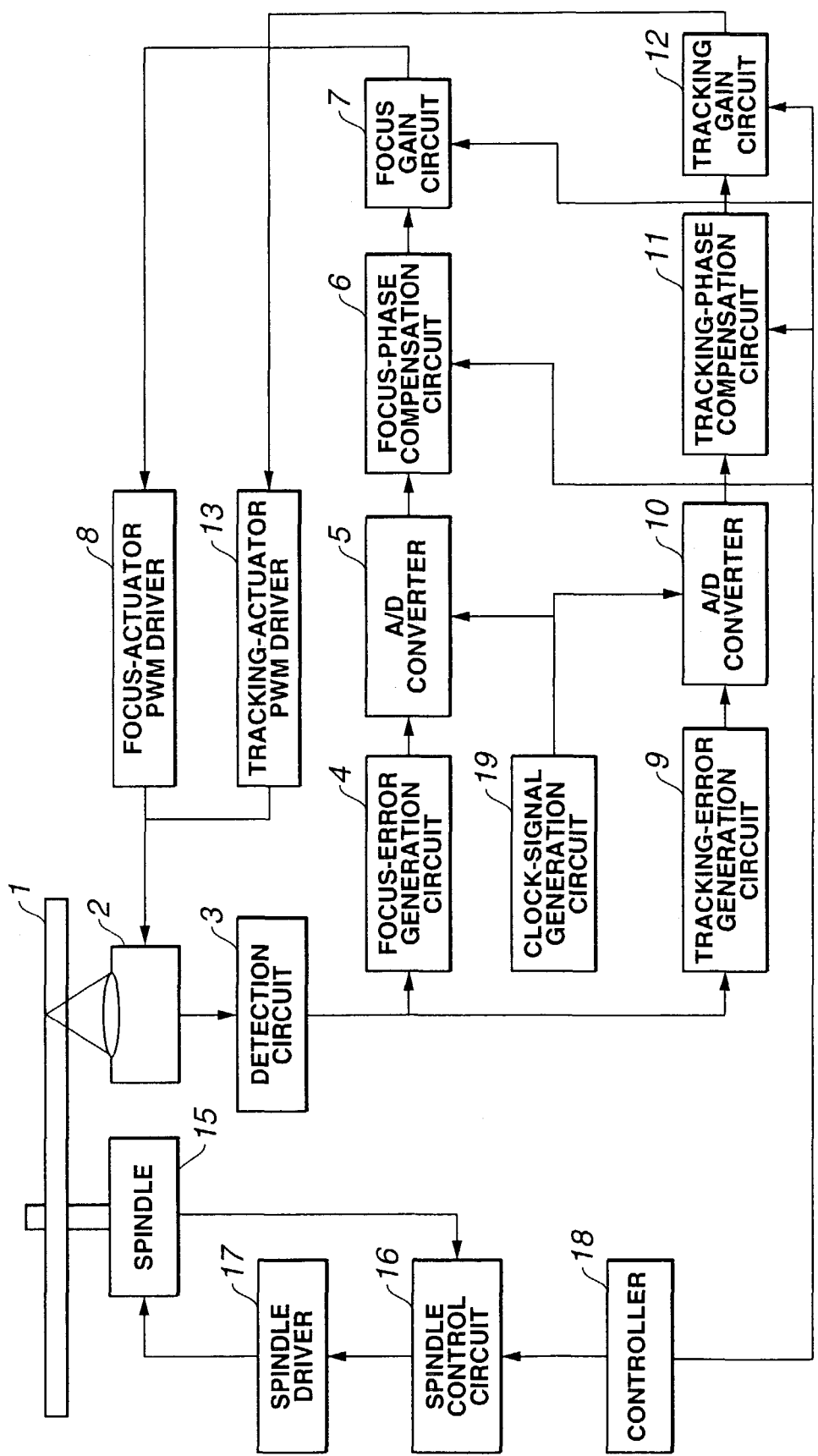
FIG. 2 is a block diagram illustrating an optical disk apparatus according to a second embodiment of the present invention.

FIG. 2 is a block diagram illustrating an optical disk apparatus according to a second embodiment of the present invention.

In FIG. 2, components other than a clock-signal generation circuit 19 have the same functions as those shown in FIG. 1.

In the second embodiment, the optical disk 1 is an ordinary optical disk having lands and grooves.

A light beam emitted from the laser source of pickup 2 is projected onto the optical disk 1. Light reflected from the optical disk 1 is sensed by the sensor of pickup 2, and is converted into an electric signal by a detection circuit 3.

A focus-error signal is generated from an output from the detection circuit 3 by a focus-error generation circuit 4, and is supplied to a focus-actuator PWM driver 8 after being converted to a digital signal by an A/D converter 5, and then with a clock period output from a clock-signal generation circuit 19 by a focus-phase compensation circuit 6 and a focus gain circuit 7, to control the focus actuator of pickup 2, thereby constituting a focus servo loop.

Similarly, a tracking-error signal is generated from the output from the detection circuit 3, according to a push-pull method or the like, by a tracking-error generation circuit 9, and is supplied to a tracking-actuator PWM driver 13 after being converted to a digital signal by an A/D converter 10, and then with the clock period output from the clock-signal generation circuit 19 by a tracking-phase compensation circuit 11 and a tracking gain circuit 12, to control the track actuator of pickup 2, thereby constituting a track servo loop.

A spindle driver 17 drives a spindle 15 so as to have a rotation frequency indicated by a controller 18, by a spindle control circuit 16 based on an FG signal (not shown), thereby constituting a spindle control loop.

In the second embodiment, each of focus control and tracking control is performed discretely by sampling at a fixed clock period output from the clock-signal generation circuit 19. Outputs from the focus-error generation circuit 4 and the tracking-error generation circuit 9 are sampled by the A/D converters 5 and 10 at the sampling period and input to the focus-phase compensation circuit 6 and the tracking-phase compensation circuit 11, respectively. Each of the focus-phase compensation circuit 6 and the tracking-phase compensation circuit 11 is configured by a digital filter, and is subjected to filter calculation with a filter coefficient set by the controller 18. Each of the focus-gain circuit 7 and the tracking gain circuit 12 is a digital multiplier, and its gain is set by the controller 18. Outputs from the focus gain circuit 7 and the tracking gain circuit 12 are output as PWM signals to the focus-actuator PWM driver 8 and the tracking-actuator PWM driver 13, respectively.

In the second embodiment, rotation control of the disk is also performed according to an MCLV method, and a zone is provided for each predetermined number of tracks in a radial direction. Control is performed with a constant rotation frequency within a zone, and with a substantially constant linear velocity between zones.

In the second embodiment, also, as in the first embodiment, the servo loop gain is set to be proportional to the rotation frequency and to the root of the rotation frequency in the case of tracking and in the case of focusing, respectively. The controller 18 has a filter-coefficient table for phase compensation and a gain table for the gain circuit corresponding to the necessary band at each zone, and sets coefficients to the focus-phase compensation circuit 6, the tracking-phase compensation circuit 11, the focus gain circuit 7 and the tracking gain circuit 12 in accordance with a zone (rotation frequency). The filter-coefficient table for each of the focus-phase compensation circuit 6 and the tracking-phase compensation circuit 11 is determined in advance so as to be able to have a sufficient phase margin at a necessary band in each zone. For example, phase compensation characteristics that are the same as the phase compensation characteristics at each zone in the first embodiment may be provided. In the first embodiment, since the sampling frequency changes depending on a zone, an optimum characteristic is obtained for each zone without changing the filter coefficient for phase compensation. In the second embodiment, however, since the sampling frequency is fixed irrespective of a zone, the filter coefficient for phase compensation must be changed for each zone. It is also possible to use a common gain table for focusing and tracking, as in the first embodiment.

As described above, even if the sampling frequency is fixed, control can be performed with small power consumption and sufficient accuracy at any zone without performing control with a wasteful servo-loop gain, e.g., that is greater than necessary.

Although in the second embodiment the MCLV method has been illustrated and the servo-loop gain is changed depending on the zone, the same effects may also be obtained in a CLV method by providing zones as in the MCVL method, and setting a necessary band at the rotation frequency at the start position of the zone (the highest rotation frequency) as a servo-loop gain for each zone.

In the MCLV method, instead of setting a servo-loop gain for each zone, it is also possible to make a plurality of zones one block, and make the servo-loop gain at a zone having the highest value within the block the set servo-loop gain.

Instead of having a setting table for each zone, as in the first embodiment, a table is provided for each block including a plurality of zones, and a servo-loop gain is set for each block. For example, in a disk apparatus in which ten zones are provided in a disk, and a rotation frequency for providing an MCLV is set at each zone, first through fifth zones constitute a first block, and sixth through tenth zones constitute a second block. A necessary servo-loop gain is set for each of the first and second blocks. In this case, it is possible to reduce the number of tables for setting filter coefficients and gains, and to reduce the capacity of a ROM of a controller.

(Third Embodiment)

In the first embodiment, a method for adjusting the gain is described when rotation control is performed with a stationary (steady state) rotation frequency. In a third embodiment of the present invention, however, a method for adjusting the gain is described when rotation control is in a transient state, such as when a pickup device moves between zones.

For example, suppose that the rotation frequency at zone 0 is 33.3 Hz, and the rotation frequency at target zone 8 is 16.5 Hz. When shifting from zone 0 to zone 8, the controller 18 first instructs the spindle control circuit 16 to rotate at a rotation frequency of 16.5 Hz. Then, the controller 18 switches off a tracking-servo-loop switch provided within the tracking gain circuit 12, and turns off an output to the tracking-actuator PWM driver 13. Then, the pickup 2 is moved toward zone 8 by the controller 18 and seeking means (not shown). At that time, the rotation frequency of the spindle is in a transient state of changing from 33.3 Hz to 16.5 Hz. When reaching the target zone, the rotation frequency at that time is not necessarily the steady state rotation frequency of the target zone. Accordingly, the controller 18 monitors the output of the clock-signal detection circuit 14, sets the gain of the tracking gain circuit 12 in accordance with the clock frequency, and starts tracking control by switching on the tracking-servo-loop switch and turning on an output to the tracking-actuator PWM driver 13. The controller 18 monitors the clock-signal detection circuit 14 until the rotation frequency of the spindle reaches a steady state, and periodically sets the gain of the tracking gain circuit 12 in accordance with the clock frequency. That is, in the third embodiment, gain setting is performed so as to follow a change of the clock frequency corresponding to a change of the rotation frequency.

As in the third embodiment, by setting the gain to a value that can sufficiently secure a phase margin, the tracking control open-loop characteristics are always stable, and stable tracking control can be realized.

Next, an operation in a transient state of the focus control system will be described. As described in the first embodiment, the necessary band of focus control must be set so as to be proportional to the root of the rotation-frequency ratio. During a seeking operation, since the rotation frequency momentarily changes, the filter coefficient and the gain may be set in accordance with changes of the rotation frequency. In this case, the filter coefficient and the gain may be obtained by providing a table for each rotation frequency or by sequential calculation.

By fixing the filter coefficient of focus control at a state of zone 0, and only setting the gain in proportion to the rotation-frequency ratio, the focus-servo loop can always be in a stable state, as in the case of tracking control. In this case, a band necessary for focus control is sometimes not satisfied. However, since the state is transient, and a recording operation, a reproducing operation or the like is not performed, a certain amount of control error will not cause a problem. A more important consideration is the stability of the focus-servo loop. When focus control reaches the target zone and the steady state rotation frequency of that zone is obtained, the filter coefficient and the gain may be changed so as to correspond to the necessary band. In such a case, it is unnecessary to have a large number of filter-coefficient tables for the focus-phase compensation circuit 6 in accordance with transient rotational frequencies. It is only necessary to have filter-coefficient tables whose number equals the number of zones.

As described above, it is possible to perform stable control even when the zone changes, as during a seeking operation or the like.

(Fourth Embodiment)

In the second embodiment, a method for adjusting the gain is described when rotation control is performed with a stationary (steady state) rotation frequency. In a third embodiment of the present invention, however, a method for adjusting the gain is described when rotation control is in a transient state, such as when the pickup moves between zones.

For example, suppose that the rotation frequency of zone 0 is 33.3 Hz, and the rotation frequency at target zone 8 is 16.5 Hz. When shifting from zone 0 to zone 8, the controller 18 first instructs the spindle control circuit 16 to rotate at a rotation frequency of 16.5 Hz. Then, the controller 18 switches off the tracking-servo-loop switch provided within the tracking gain circuit 12, and turns off an output to the tracking-actuator PWM driver 13. Then, the pickup 2 is moved toward zone 8 by the controller 18 and seeking means (not shown). At that time, the rotation frequency of the spindle is in a transient state of changing from 33.3 Hz to 16.5 Hz. The controller 18 starts tracking control by switching on the tracking-servo-loop switch and turning on an output to the tracking-actuator PWM driver 13, while fixing the filter coefficient and the gain. The controller 18 monitors the clock-signal detection circuit 14 until the rotation frequency of the spindle reaches a steady state, and sets the filter coefficient and the gain of the target zone when a steady state is obtained. Similarly, as for an operation in a transient state of the focus control system, setting at the start zone may remain in a transient state, and when a steady state is obtained, the filter coefficient and the gain of the target zone may be set. As described above, the tracking-servo loop and the focus-servo loop can always be in a stable state. In this case, a band necessary for tracking control and focus control is sometimes not satisfied. However, since the state is transient, and a recording operation, a reproducing operation or the like is not performed, a certain amount of control error will not cause a problem. A more important consideration is the stability of the focus-servo loop. When control reaches the target zone and the steady state rotation frequency of that zone is obtained, the filter coefficient and the gain may be changed so as to correspond to the necessary band. In such a case, it is unnecessary to have a large number of filter-coefficient tables for the focus-phase compensation circuit 6 and the tracking-phase compensation circuit 11 in accordance with transient rotational frequencies. It is only necessary to have filter-coefficient tables whose number equals the number of zones.

As described above, stable control can be performed even when the zone changes, as during a seeking operation or the like.

As described above, according to the present invention, by changing at least one of the gain and the filter coefficient in a tracking(focus)-servo control system in accordance with the radial-direction position of an optical spot, i.e., in accordance with the rotation frequency of an optical disk, unnecessary current does not flow in an actuator, and it is possible to prevent unnecessary power consumption, to prevent temperature rise in the actuator, and to reduce noise generated by the actuator.

In an MCLV method in which a sample servo disk is controlled with an MCLV operation, it is possible to perform stable control while suppressing servo deviation within an allowable range.

The individual components designated by blocks in the drawings are all well known in the optical information reproducing apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical information reproducing apparatus for recording or reproducing information by controlling rotation of an optical disk so as to provide a constant linear velocity by changing a rotation frequency in accordance with a radial-direction position of an optical spot, said apparatus comprising:
    a circuit configured to control rotation of the optical disk by changing a rotation frequency thereof;
    a focusing servo control circuit and a tracking servo control circuit for the optical spot; and
    a circuit configured to adjust a servo-loop gain of a tracking servo control in accordance with the change of the disk rotation frequency,
    wherein said circuit configured to adjust the servo-loop gain of tracking servo control adjusts the servo-loop gain so that when a servo gain at a highest rotation frequency Wmax is represented by Gmax, and a rotation frequency is represented by Wcurr, a servo gain Gcurr satisfies the following relationship:

$Gcurr = Gmax \times (Wcurr/Wmax)^2$.

2. An optical information reproducing apparatus for recording or reproducing information by controlling rotation of an optical disk so as to provide a constant linear velocity by changing a rotation frequency in accordance with a radial-direction position of an optical spot, said apparatus comprising:
    a circuit configured to control rotation of the optical disk by changing a rotation frequency thereof;
    a focusing servo control circuit and a tracking servo control circuit for the optical spot; and
    a circuit configured to adjust a servo-loop gain of a tracking servo control in accordance with the change of the disk rotation frequency,
    wherein said focusing servo control circuit comprises a circuit configured to adjust the servo-loop gain of focusing servo control, and wherein when said circuit configured to adjust the servo-loop gain of tracking servo control changes the servo-loop gain of the tracking servo control with a predetermined ratio, said circuit configured to adjust the servo-loop gain of focusing servo control changes the servo-loop gain of focusing servo control with a ratio proportional to the root of the predetermined ratio.

3. An optical information reproducing apparatus for recording or reproducing information using an optical spot by controlling rotation of an optical disk so as to provide a constant linear velocity by changing a rotation frequency in accordance with a radial-direction position of the optical spot, said apparatus comprising:
    a circuit configured to control rotation of the optical disk by changing a rotation frequency thereof;
    a focusing servo control circuit and a tracking servo control circuit for the optical spot; and
    a circuit configured to adjust a servo-loop gain of a focus servo control in accordance with the change of the disk rotation frequency,
    wherein said circuit configured to adjust the servo-loop gain of focusing servo control adjusts the servo-loop gain so that when a servo gain at a highest rotation frequency Wmax is represented by Gmax, and a rotation frequency is represented by Wcurr, a servo gain Gcurr satisfies the following relationship:

$Gcurr = Gmax \times Wcurr/Wmax$.

4. An optical information reproducing apparatus for recording or reproducing information using an optical spot by controlling rotation of an optical disk so as to provide a constant linear velocity by changing a rotation frequency in accordance with a radial-direction position of the optical spot, said apparatus comprising:
    a circuit configured to control rotation of the optical disk by changing a rotation frequency thereof;
    a focusing servo control circuit and a tracking servo control circuit for the optical spot; and
    a circuit configured to adjust a servo-loop gain of a focus servo control in accordance with the change of the disk rotation frequency,
    wherein said tracking servo control circuit comprises a circuit configured to adjust the servo-loop gain of tracking servo control, and wherein when said circuit configured to adjust the servo-loop gain of the focusing servo control changes the servo-loop gain of focusing servo control with a predetermined ratio, said circuit configured to adjust the servo-loop gain of tracking servo control changes the servo-loop gain of tracking servo control with a ratio proportional to the square of the predetermined ratio.

* * * * *

UNITED STATES PATENT AND TRADEMARK OFFICE
CERTIFICATE OF CORRECTION

PATENT NO.        : 7,304,919 B2
APPLICATION NO.   : 10/608108
DATED             : December 4, 2007
INVENTOR(S)       : Hirotake Ando Page 1 of 1

It is certified that error appears in the above-identified patent and that said Letters Patent is hereby corrected as shown below:

COLUMN 2

Line 31, "a" should read --as--;
    Line 41, "planer" should read --is planar--;
    Line 50, "planer" should read --planar--;
    Line 52, "planer" should read --planar--; and
    Line 54, "planer" should read --planar--.

COLUMN 7

Line 14, "he" should read --the--; and
    Line 54, "a" should read --α--.

COLUMN 8

Line 5, "planer" should read --planar--.

COLUMN 9

Line 4, "weight a" should read --weight α--.

Signed and Sealed this

Thirtieth Day of September, 2008

JON W. DUDAS
*Director of the United States Patent and Trademark Office*